(No Model.)
A. DE LODYGUINE.
INCANDESCENT ELECTRIC LAMP.
No. 498,901. Patented June 6, 1893.
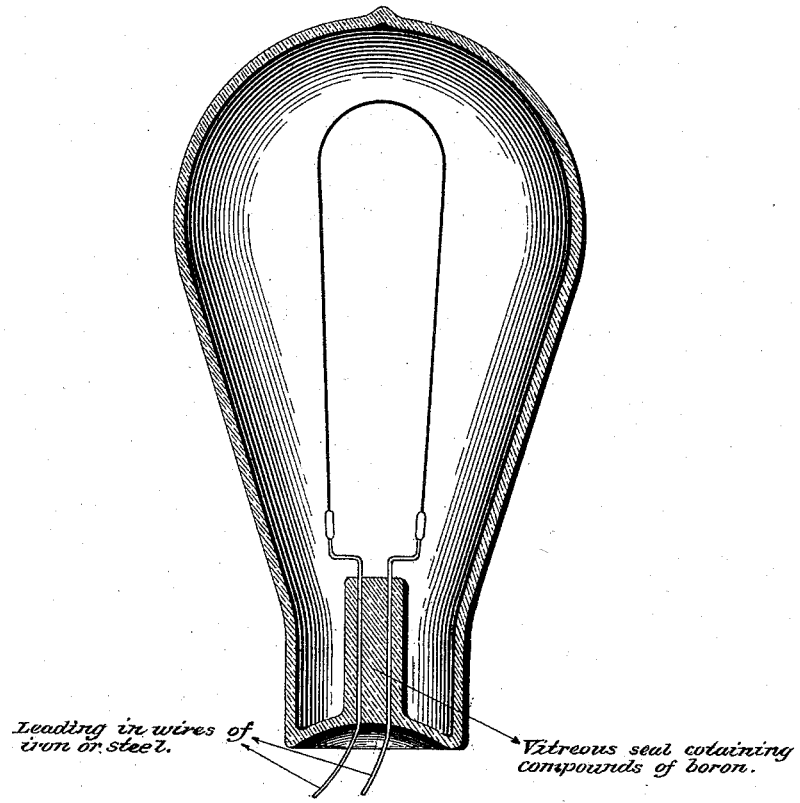
Leading in wires of iron or steel.
Vitreous seal cotaining compounds of boron.
Witnesses
L. C. Hills
Ewell A. Dick
Inventor
Alexander de Lodyguine
by Marcellus Bailey
his Attorney

UNITED STATES PATENT OFFICE.

ALEXANDER DE LODYGUINE, OF PARIS, FRANCE.

INCANDESCENT ELECTRIC LAMP.

SPECIFICATION forming part of Letters Patent No. 498,901, dated June 6, 1893.

Application filed March 11, 1892. Serial No. 424,525. (No model.)

*To all whom it may concern:*

Be it known that I, ALEXANDER DE LODYGUINE, a subject of the Czar of Russia, domiciled in Paris, France, and temporarily residing in Pittsburg, Pennsylvania, have invented a new and useful Improvement in Incandescent Electric Lamps, of which the following is a specification, reference being had to the accompanying drawing, in which—

I have represented in longitudinal central section an incandescent lamp bulb having iron or steel leading-in wires sealed therein in accordance with my invention; and I have indicated thereon graphically the nature both of the seal and of the leading-in wires. The material of which the seal is composed is represented as slightly differing in appearance from that which forms the body of the bulb. This however is merely to make the invention more apparent on the drawing. In the actual lamp no such difference necessarily is discernible to the eye.

The object of my invention is to make it feasible and practicable to use iron or steel or their alloys for the leading-in wires or conductors of incandescent lamps. The use of iron for this purpose has heretofore been suggested and essayed—see for example United States Patent No. 335,160 to Thompson of February 2, 1886. In such efforts in this direction as have heretofore been made, it has so far as I am informed been proposed to interpose between the iron conductor and the glass of the lamp bulb a cement or composition having substantially the same co-efficient of expansion as the iron—the fusing of the glass itself to the iron being ineffective because of the difference between their co-efficients of expansion whereby the heating of the iron leading-in wires would impair the joint destroying its air tight character, and permitting air to filter therethrough into the bulb. Notwithstanding, however, the efforts above referred to, iron and steel leading-in wires are nowhere employed, so far as I am informed, in the commercial incandescent electric lamp of to-day; and these wires are universally formed of platinum, which, because its expansion corresponds very nearly to that of the material of which the bulb is composed, can by a glass seal be sealed directly into the glass bulb. This metal however as is well known is very expensive and materially enhances the cost of the lamp. To this last named fact the efforts to efficiently substitute cheaper metals are mainly if not entirely attributable.

It has been my object to effect this substitution of the cheaper metals, such as iron or steel, for the platinum without the use of intermediate cement or composition and in effect to efficiently seal such metal wires into the bulb in substantially and essentially the same way in which wires of platinum are now sealed into the bulb—and with the same result so far as the impermeability and permanency of the seal and joint between the wires and the glass are concerned. To this end I have proposed to myself to so alter or modify the chemical constitution or composition of the glass now used to seal platinum leading-in wires in the neck of the incandescent lamp bulb, that it will form an absolutely tight joint with leading-in conductors of the cheaper metals such for example as iron and steel and their alloys. I have discovered that this result can be attained by introducing into the glass of which the seal is formed, compounds containing boron, e. g. anhydrous oxide of boron $B_2O_3$; borax hydrate $Na_2 2B_2O_7 10H_2O$; anhydrous borax $Na_2 2B_2O_7$, or boracic acid $BO_3H_3$. The glass thus formed can be perfectly soldered or joined to leading-in wires or conductors of iron, steel or their alloys, and the joint when sealed in the neck of the bulb of the incandescent lamp remains unimpaired and air tight when the wires are heated. To what this result is due—whether to the fact that by the introduction of boron the glass which forms the seal is given substantially the same co-efficient of expansion as the iron or steel conductors, or to other causes—I have not as yet been able to accurately determine; but the fact remains that I am enabled in the way indicated to seal the iron conductors directly with glass, and to obtain under these conditions a permanent and enduring air tight seal.

A glass or vitreous composition suitable for the seal and adapted to secure the results above referred to can be obtained by taking ingredients such as below named in the stated proportions by weight, viz: carbonate of soda, 22.47; oxide of lead, 20.59; boracic acid, 6.24; white sand, 50.00, melting and fusing them together and using the glass thus produced for sealing the leading-in wires or conductors into the neck of the glass bulb of the lamp.

The glass after having been fused and applied to the leading-in wires will be found on analysis to contain the following elements in approximately the following proportions, viz: oxide of sodium, 12.36; oxide of lead, 24.23; oxide of boron, ($B_2O_3$,) 4.64; silica, 58.76.

While my invention has been devised with special reference to leading in wires of iron or steel; I find also that a tight seal can also be obtained by the use of the boron glass with leading in wires of other metals. In sealing the leading in wires into the lamp I can use the boron glass in the same way that ordinary glass is used to seal platinum leading-in wires. But I find that the best results can be obtained by pursuing the following method. The boron glass is drawn into the shape of a thin tube of an interior diameter equal to or a little greater than the distance which should intervene between the leading-in wires—e. g. one-eighth of an inch in diameter. From this glass tube is cut a piece of the desired length for that part of the seal to be formed of the boron glass—say three-fourths of an inch. The leading-in wires are first fixed in a suitable holder—as for example in pinchers such as ordinarily used for holding platinum wires during the sealing operation; the boron glass bit of tube is put on the wires; and one end of it is sealed to the wires by the action of a flame in the usual manner. Then the pinchers are moved to cause the tube to traverse the flame in one direction, this movement being gradual and in proportion to the melting of successive portions of the tube, until the tube has entirely melted and has taken the form of the ordinary seal; after this the heating and melting of the glass are repeated by moving the pinchers in the opposite direction, but this time the melted material of the seal should be squeezed or pressed upon and around the wires by a suitable tool, so that air cannot possibly have access to that portion of the wires covered by the seal. The wires in this way are preserved from any further oxidation. As to the oxides which have been formed during the sealing operation, they are dissolved in the boron glass, and the wires themselves are stripped of any oxide coating.

When the proportion of boron anhydride in the glass is not very considerable, or when the melting point of the glass is very low, or when the glass itself contains oxides reducible in the presence of the metal sealed-in, or when from one cause or another the reaction of the boron anhydride in the glass proves to be insufficient, I make use of the following procedure: The iron leading in wires to be sealed-in are cleansed of oxides by means of emery paper, or by acid, or in any other convenient way. I then lightly smear the wires with a solution of the chloride of zinc or other substance such as a solution of chloride of iron, giving the same results, after which I sprinkle the wires with a compound or substance having the property of dissolving metallic oxides—such for example as pulverized borax, borate of ammonia, boracic acid or oxide of boron. The solution should not be in quantity sufficient to form a drop on the wires, nor should the powder gather in balls or lumps on the same. Any surplus powder should be shaken off from the wires by gently striking the pinchers which hold the wires against some solid body.

In lieu of applying to the wires first a solution such as above specified and then the powder, I can apply to the wires simply a solution of borate of zinc with chloride of sodium—or some other liquid of the kind. After this treatment of the wires they are incased by the tube of boron glass and sealed therein as hereinbefore explained. The object of thus treating the wire is to preserve it from oxidation during its sealing into the boron glass—this object being accomplished by the employment of an acid, salt or base which at the beginning of the heating during the sealing operation will form with the oxide of the metal a compound which by the further heating is dissolved, decomposed or evaporated leaving a pulverulent metallic oxide readily soluble in glass containing boron compounds.

In the case of wires treated with chloride of zinc and borax as a flux, for example, the chloride of zinc melts at 250° centigrade (at which temperature iron exposed to flame begins to oxidize) and commences to evaporate when the temperature rises beyond 400° centigrade. At the last named temperature however the pulverized borax melts, and in its turn protects the wires from oxidizing, and dissolves the forming oxides, and then the glass itself melts and covers the wires. Excellent results also may be obtained if the wire is smeared with a resinous solution. This substance preserves at first the wire from oxidation, and then, on decomposing, gives a pulverulent carbon which partly reduces a part of the oxide on the surface of the wire and leaves the remainder in the pulverulent state requisite to render it readily soluble in the boron glass. I can also use for for this purpose solid fusible hydrocarbons, or hydrocarbons which do not readily evaporate.

The solidity and permanency of the air tight joints of the lamp can be enhanced and assured by the employment of cements, mastics or varnishes impenetrable to air and applied externally to the lamp at the point where the wires pass out from the lamp after the boron glass seal has been sealed into the latter. The best substances known to me for this purpose are solutions of the hard copal resin obtained from the plants *Hymenœa verrucosa* and *Eloecarpus copalliferus*, amber resin, and the resin known as idrialin, whether used separately or in combination together, or with other cements, mastics or varnishes.

I have hereinbefore stated one special composition for boron glass. Manifestly however the ingredients can be varied, as well as the proportions in which they are used. The best results however so far as my experience goes are obtained by the use of a glass which after fusion contains from 0.63 to 2.2 per cent. by weight of pure boron, or from two to seven per cent. by weight of boron anhydride, or a corresponding proportion of boron compounds; and to a glass seal containing such percentage of boron or boron compounds (whether used with wires of iron and steel, or wires of other metal) I desire to be understood as laying special claim.

For the purpose of my invention it is only necessary to make the seal itself of the composition above referred to; although it would be practicable if desired to make the whole glass bulb of the lamp of the same composition.

In conclusion I state that I am aware that borax has been used as a flux in other kinds of work, and this I do not claim; but what I do claim, and desire to secure by Letters Patent, is—

1. An incandescent electric lamp having leading-in wires of iron, steel or their alloys, hermetically sealed into the glass bulb of the lamp by a glass seal containing compounds of boron, substantially as specified.

2. A seal for the leading-in wires of incandescent lamps, composed of glass or vitreous composition containing compounds of boron in substantially the proportions stated.

3. A glass of vitreous composition for sealing the leading-in wires of incandescent lamps, containing from 0.63 to 2.2 per cent. by weight of pure boron, or a corresponding proportion of boron compounds as hereinbefore specified.

4. The method of sealing metallic leading-in wires into glass containing boron compounds, which consists in first coating or treating the metallic wires with a composition substantially such as specified which under the influence of the heat of the sealing operation will convert the oxide of the metal into oxide readily soluble in the boron glass, and then applying the said glass to the wires and sealing the latter therein, substantially as hereinbefore set forth.

In testimony whereof I affix my signature in presence of two witnesses.

ALEXANDER DE LODYGUINE.

Witnesses:
AUGUST AMMON,
WM. T. ADAIR.